(12) United States Patent
Vasconcellos et al.

(10) Patent No.: US 8,518,267 B2
(45) Date of Patent: Aug. 27, 2013

(54) TREATMENT OF SURFACTANT LADEN WASTEWATER

(75) Inventors: Stephen Robert Vasconcellos, Doylestown, PA (US); Matthew D. Mersch, Louisville, KY (US); James Quentin Pollett, Louisville, KY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/326,396

(22) Filed: Dec. 15, 2011

(65) Prior Publication Data

US 2013/0153512 A1 Jun. 20, 2013

(51) Int. Cl.
*B01D 21/01* (2006.01)
*B03D 3/00* (2006.01)
*C02F 1/52* (2006.01)
*B01D 1/00* (2006.01)
*B03D 1/00* (2006.01)
*C02F 1/24* (2006.01)
*C08B 37/08* (2006.01)

(52) U.S. Cl.
USPC .......... 210/730; 210/705; 210/723; 210/728; 536/20

(58) Field of Classification Search
None
See application file for complete search history.

(56) References Cited

U.S. PATENT DOCUMENTS

| | | | |
|---|---|---|---|
| 3,288,770 A | 11/1966 | Butler | |
| 4,056,432 A | 11/1977 | Slagel et al. | |
| 5,182,331 A | 1/1993 | Liao et al. | |
| 5,207,922 A * | 5/1993 | McFarlan et al. | 210/708 |
| 5,368,744 A | 11/1994 | Wood et al. | |
| 5,393,435 A | 2/1995 | Deans et al. | |
| 5,442,048 A | 8/1995 | Meister et al. | |
| 5,523,000 A * | 6/1996 | Falbaum et al. | 210/708 |
| 5,741,768 A | 4/1998 | Falbaum et al. | |
| 5,744,064 A | 4/1998 | Galante et al. | |
| 5,853,596 A * | 12/1998 | Gibson | 210/708 |
| 6,294,622 B1 | 9/2001 | Barajas et al. | |
| 6,319,412 B1 | 11/2001 | Reyna | |
| 6,455,661 B1 | 9/2002 | Antal et al. | |
| 7,160,470 B2 | 1/2007 | Davis et al. | |
| 7,331,355 B2 | 2/2008 | Barnabas et al. | |
| 7,374,690 B2 | 5/2008 | Reddy | |
| 7,595,007 B2 | 9/2009 | Sikes et al. | |
| 2002/0189022 A1 | 12/2002 | Chang | |
| 2004/0142834 A1 | 7/2004 | Wegner | |
| 2011/0297622 A1 | 12/2011 | Suresh et al. | |
| 2012/0058060 A1 * | 3/2012 | Noor et al. | 424/59 |

FOREIGN PATENT DOCUMENTS

| | | |
|---|---|---|
| DE | 19544455 A1 | 6/1997 |
| EP | 0074776 A2 | 3/1983 |
| WO | WO 2008/079652 A1 | 7/2008 |

OTHER PUBLICATIONS

Wang, Jian-Ping et al. "Synthesis and characterization of a novel cationic chitosan-based flocculant with a high water-solubility for pulp mill wastewater treatment", Water Treatment, 2009, 43, 5267-5275, Elsevier.*
Halosource, MSDS, StormKlear: Liqui-Floc 2%, Mar. 9, 2007, 6 pages.
Lee et al., "Optimizing the Coagulant Dose to Control Membrane Fouling in Combined Coagulation/Ultrafiltration Systems for Textile Wastewater Reclamation", Chemical Engineering Journal, vol. 155, (2009) pp. 101-107.
Cascade Ecosolutions, 1% ChitoVan Product Specification Sheet, 1 page.
Rocklin Products, "FlocClear: Next Generation Technology", 4 pages, May, 6, 2013.
Search Report and Written Opinion from corresponding PCT Application No. PCT/US2012/063849 dated Mar. 14, 2013.
Wang et al., "Synthesis and characterization of a novel cationic chitosan-based flocculant with a high water-solubility for pulp mill wastewater treatment", Water Research, Elsevier, Amsterdam, NL, vol. 43, No. 20, pp. 5267-5275, Dec. 1, 2009.

* cited by examiner

*Primary Examiner* — Nam Nguyen
*Assistant Examiner* — Clare Perrin
(74) *Attorney, Agent, or Firm* — Wegman, Hessler & Vanderburg

(57) ABSTRACT

Clarification of surfactant laden wastewaters of the type commonly encountered in the laundry, dishwashing, textile manufacturing, and metal cleaning and degreasing processes is provided by use of a chitosan/(meth)acrylyloxy alkyl quaternary ammonium salt graft polymer.

5 Claims, No Drawings

TREATMENT OF SURFACTANT LADEN WASTEWATER

FIELD OF INVENTION

The invention pertains to clarification treatment of surfactant laden wastewater by chitosan/(meth)acrylyl oxyalkyl quaternary ammonium salt graft polymers.

BACKGROUND OF THE INVENTION

Operations of certain processes generate wastewaters having high levels of organic materials and surfactants. These wastewaters are difficult to clarify as the higher surfactant levels tend to form emulsions that are not easily broken. These surfactant laden wastewaters have high COD (chemical oxygen demand) levels due to the high levels of insoluble and soluble organic materials and surfactants therein.

Under current environmental regulation standards, before these high COD level streams can be introduced into the environment, the COD level must be reduced to acceptable levels permitted by the regulations. Otherwise, discharge of such high COD level wastewaters as effluents into municipal sewage systems for treatment will result in a surcharge assessment based on the level of COD in the effluent.

Such surfactant laden wastewaters are commonly encountered in dishwater, laundry, textile processing, metal cleaning, and degreasing operations.

SUMMARY OF THE INVENTION

In one aspect of the invention, surfactant laden wastewater is clarified by contacting the wastewater with a chitosan/(meth)acrylyloxy alkyl quaternary ammonium salt graft polymer (C/MAOA Quat).

In another embodiment, the aqueous medium to be treated comprises a surfactant level of greater than 50 ppm. Such high surfactant content wastewaters may be commonly encountered as effluent from laundry, dishwashing, textile manufacturing, and metal cleaning and degreasing processes.

In another exemplary embodiment, the polymeric treatment comprises a chitosan/(METAS) graft polymer. METAS is 2-(meth)acryloxyethyltrimethyl ammonium sulfate.

In one embodiment, the poly(METAS)/chitosan graft polymer may have a viscosity within the range of 100 cps to about 3,000 cps, and it may added to the treated wastewater in an amount of about 40-4,000 ppm.

In one particular laundry wastewater environment, the wastewater comprises anionic surfactant therein. Another exemplary wastewater to be treated in accordance with the invention is wastewater from a dishwashing process. Another example would comprise nonionic surfactants.

In yet another advantageous embodiment, the C/MAOA Quat graft polymer is chloride free.

DETAILED DESCRIPTION OF EXEMPLARY EMBODIMENTS

The wastewaters that can be successfully treated by the process of the invention are characterized by having one or more surfactants therein at high concentrations. The surfactants may be one or more of a myriad of surfactant types including anionic, nonionic, and cationic surfactants such as, but not limited to, linear and secondary alcohol ethoxylates, linear alkyl sulfates (LAS), dodecyl benzene sulfonic acid (DDBAS), cetyl trimethyl ammonium bromide (CTAB) ethyleneoxide/propylene oxide (EO/PO) block copolymers, betaines and the like.

In accordance with one aspect of the invention, the wastewaters that are treated comprise about 200-3,000 ppm Total Dissolved Solids (TDS); about 5-500 ppm Total Suspended Solids (TSS); COD levels of about 200-2,500 ppm, hardness of about 50-300 ppm, pH of about 5-9, and turbidity of about 1-500 ntu.

Typical laundry wastewaters that may be clarified by the instant processes include detergents with the optional addition of textile softeners. The detergents commonly include a variety of anionic surfactants, a base, and other additives. Many of the detergents employ Linear Alkyl Benzene Sulfonates as the anionic surfactant and several of the commercially available textile softeners are of the cationic surfactant class. In some instances, the cationic surfactants in the softener may be chosen from the group of ammonium salts, quaternary ammonium salts, alkyl pyridium salts, and imidazolines.

In one aspect of the invention, when laundry wastewaters are to be clarified, the cationic surfactant is selected from at least one of the group consisting of ammonium salts, quaternary ammonium salts, alkyl pyridium salts, and imidazolines. In one exemplary embodiment, the surfactant can include polyamines, polyamides, fatty amines, alkyl ammonium salts (e.g., fatty amide), ethanolamines, and polyethylene amines. The quaternary ammonium salts include alkyl quaternary ammonium salts, dialkyl quaternary ammonium salts, fatty ammonium salts, dimethyl dialkyl quaternary ammonium salts, and diamide quaternary ammonium complexes.

Other typical characteristics of exemplary laundry wastewaters may be characterized as follows:

Laundry Wastewater

Concentrations Vary Based Upon Number of Wash and Rinse Cycles

| Analyte | Chemical Characteristics | Concentration Ranges mg/L unless specified otherwise |
|---|---|---|
| pH | | 7-9 |
| Chlorine Total Residuals | oxidant | <0.2-30 |
| Turbidity | | 8 NTU-340 NTU |
| TSS | Total Suspended Solids (Insoluble Solids) | 9-320 |
| TDS | Total Dissolved Solids (Soluble Compounds) | 350-1800 |
| Alkalinity ($CaCO_3$) | Anion | 70-630 |
| Calcium | Cation | 25-55 |
| Magnesium | Cation | 10-15 |
| Hardness ($CaCO_3$) | Hardness | 100-200 |
| Hardness ($CaCO_3$) mg 17.1 g/gal. | Hardness | 5-12 grains/gal. |
| Phosphate | Anion | <2.0-2.0 |
| Sodium | Cation | 29-250 |
| BOD | Biological Oxygen Demand | 40-2000 |
| COD | Chemical Oxygen Demand | 40-1500 |
| Color | organic, neutral, cationic, anionic compounds | 60-220 ADMI-American Dye Manufacturers Institute |
| Surfactant | organic, neutral, cationic, anionic compounds | <0.2-120 |
| TOC | Total Organic Carbon | 6-870 |
| TDC | Total Dissolved Carbon | 3-610 |
| TOC-TDC | Total Insoluble Carbon | 1.5-260 |

-continued

| Analyte | Chemical Characteristics | Concentration Ranges mg/L unless specified otherwise |
|---|---|---|
| O & G | Oil and grease-total | <5.0-40 |
| O & G Hydro | Oil and grease-hydrocarbon | <5.0-12 |
| Coliform Bacteria | Bacteria (possible pathogens) | 3.1 per 100 ml-2400 per 100 ml |
| HPC | Bacteria | 15,000 per ml-110,000 per ml |
| Particulate Size | Particulate Size (10%-95%) | mean 30 μm- mean 60 μm |

Typical dishwasher wastewaters or effluents that may be treated in one exemplary embodiment of the invention may comprise food soils such as the following:

| Food Soil Type | Mass (g) Fat/Carb/Protein | Total g |
|---|---|---|
| peanut butter | 16/7/7 | 32 |
| raspberry preserves | 0/13/0 | 20 |
| dried oatmeal | 2/19/4 | 28 |
| bread crumbs | 1.5/19/4 | 28 |
| Total | 19.5/58/15 | 108 |

Food soils such as that noted above may be mixed with commercially available powered detergent and tap water. These wastewaters can comprise up to about 1200 ppm of dissolved solids and up to about 600 ppm of suspended solids. Other parameters common to exemplary dishwater effluents that may be treated in accordance with the invention may be as follows:

| Parameter | Value | Units |
|---|---|---|
| Conductivity | 5000 | Micro Siemens |
| Turbidity | 930 | NTU |
| pH | 10.3 | — |
| Temperature | 120 | ° F. |
| Hardness | 210 | ppm |

In one exemplary embodiment, high surfactant wastewaters are clarified by contacting same with a chitosan/quaternary ammonium acrylate polymer coagulant treatment. More specifically, the polymer treatment may be chitosan/(meth) acrylyloxy alkyl quaternary ammonium salt graft polymers (C/MAOA Quat). Preferably, the alkylene moiety bridging the (meth)acrylyloxy function to the quaternary nitrogen comprises from 1 to about 4 C atoms. Dosage of the coagulant polymer treatment may range from about 4-10,000 ppm treatment per 1 million parts of the wastewater. Preferably, the coagulant treatment polymer is fed in the amount of about 40-4,000 ppm. In one aspect of the invention, highly surfactant laden wastewaters, such as those having a surfactant level of greater than 50 ppm and a COD of greater than about 200 ppm, are contacted by the coagulant polymers.

In another exemplary embodiment, a C/MAOA Quat polymer is brought into contact with a surfactant laden wastewater of the type chosen from the group consisting of wastewater from laundry, dishwashing, textile manufacturing, metal cleaning, and degreasing processes as a clarification aid. The treatment results in formation of a settleable floc that can be separated from the wastewater via conventional techniques.

In one embodiment, the coagulant polymeric treatment that is to be brought into contact with the surfactant laden wastewater is a chitosan/acrylyloxy alkyl ($C_1$-$C_4$) quaternary ammonium salt graft polymer. In certain embodiments, the coagulant polymer is poly-(METAS)-Chitosan polymer having repeating units of:

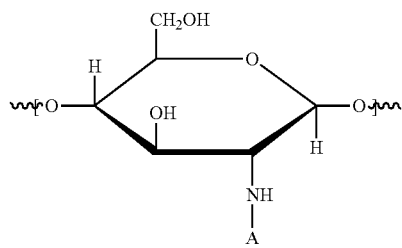

wherein A has the formula of:

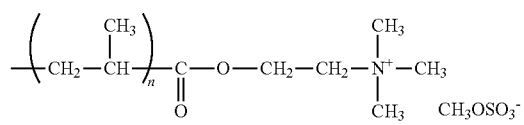

and n is an integer from 50 to 5000. In another embodiment, n is an integer from 100 to 1,000 or in an even more preferred embodiment, n is an integer from 100 to 500. METAS is 2-(meth)acryloxyethyltrimethyl ammonium sulfate.

In one embodiment, poly(METAS)-Chitosan polymer has a viscosity measured at 25° C. in the range of from about 100 cps to about 3000 cps. In another embodiment, the poly (METAS)-Chitosan polymer has a viscosity in the range of from about 500 cps to about 2000 cps. In another embodiment, the poly(METAS)-Chitosan polymer has a viscosity in the range of from about 500 cps to about 1500 cps.

In one embodiment, the poly(METAS)-Chitosan polymer includes 2-methacrylyloxyethyltrimethyl ammonium methyl sulfate groups grafted onto a chitosan backbone.

Chitosan is a linear polysaccharide containing deacetylated units and acetylated units. In one embodiment, the deacetylated unit may be β-(1-4)-linked D-glucosamine. In another embodiment, the acetylated unit may be N-acetyl-D-glucosamine units. Chitosan may be prepared by deacetylating chitin with a strong alkali and is available commercially from India Sea Foods. Chitosan may be present from about 5 percent by weight to about 30 percent by weight, based on the weight of the composition. In another embodiment, chitosan may be present from about 10 percent by weight to about 30 percent by weight, based on the weight of the composition. In another embodiment, chitosan may be present from about 20 percent by weight to about 30 percent by weight, based on the weight of the composition.

2-Methacryloyloxyethyltrimethyl ammonium methyl sulfate is available commercially, such as from Ciba. 2-Methacryloyloxyethyltrimethyl ammonium methyl sulfate may be present in the polymer from about 25 percent by weight to about 75 percent by weight, based on the weight of the composition. In another embodiment, 2-Methacryloyloxyethyltrimethyl ammonium methyl sulfate may be present from about 30 percent by weight to about 70 percent by weight, based on the weight of the composition. In another embodiment, 2-Methacryloyloxyethyltrimethyl ammonium methyl sulfate may be present from about 35 percent by weight to about 65 percent by weight, based on the weight of the composition.

As to the methods by which the chitosan/(meth)acryly-loxyalkyl ($C_1$-$C_4$) quaternary ammonium salt graft polymers may be made, in one embodiment, chitosan is polymerized with 2-methacrylyloxyethyltrimethyl ammonium methyl sulfate. The chitosan forms a backbone to which the 2-methacryloyloxyethyltrimethyl ammonium methyl sulfate is grafted. In one embodiment, 2-methacryloyloxyethyltrimethyl ammonium methyl sulfate may be present from about 25 percent by weight to about 75 percent by weight, based on the weight of the reactants. In another embodiment, 2-methacryloyloxyethyltrimethyl ammonium methyl sulfate may be present from about 30 percent by weight to about 70 percent by weight, based on the weight of the reactants. In another embodiment, 2-methacryloyloxyethyltrimethyl ammonium methyl sulfate may be present from about 35 percent by weight to about 65 percent by weight, based on the weight of the reactants.

In one embodiment, the chitosan and 2-methacryloyloxyethyltrimethyl ammonium methyl sulfate are polymerized in the presence of redox initiators. The redox initiators may be present from about 1 percent by weight to about 10 percent by weight, based on the weight of the reactants. In one embodiment, the redox initiators may be present from about 3 percent by weight to about 7 percent by weight, based on the weight of the reactants. In one embodiment, the redox initiators includes an oxidizing agent and a reductant, which are described above. In one embodiment, the oxidizing agent may be present from about 0.5 percent by weight to about 5 percent by weight, based on the weight of the reactants. In another embodiment, the oxidizing agent may be present from about 1 percent by weight to about 5 percent by weight, based on the weight of the reactants. In another embodiment, the reductant may be present from about 0.5 percent by weight to about 5 percent by weight, based on the weight of the reactants. In another embodiment, the reductant may be present from about 1 percent by weight to about 5 percent by weight, based on the weight of the reactants.

The chitosan and 2-methacryloyloxyethyltrimethyl ammonium methyl sulfate may be polymerized in any suitable manner. In one embodiment, the polymerization may be at an elevated temperature. In another embodiment, the polymerization may occur at a temperature from about 40° C. to about 90° C. In another embodiment, the temperature of the polymerization may be from about 40° C. to about 85° C. In another embodiment, the temperature may be from about 50° C. to about 80° C.

In one embodiment, the coagulant polymer may be prepared in a single reactor. In one embodiment, the reaction may occur in an aqueous solution. In another embodiment, the aqueous solution may be water.

The chitosan/(meth)acrylyloxy alkyl ($C_1$-$C_4$) quaternary ammonium salt graft polymer coagulant treatment may be brought into contact with the wastewater in any suitable manner. For example, in one embodiment, the coagulant is injected into the wastewater. In another embodiment, the coagulant is added via dilution with a chemical feed pump, such as an LMI pulse pump. In one embodiment, the coagulant may be added in a continuous manner One advantage attendant upon use of the invention is that a coagulant is provided that is capable of treating high surfactant wastewaters having surfactant levels of >50 ppm and COD levels of greater than 200. Such wastewaters are difficult to treat by conventional coagulants. The chitosan/(meth)acrylyloxyalkyl ($C_1$-$C_4$) quaternary ammonium salt graft polymer coagulants are capable of treating these wastewaters resulting in surfactant and COD levels allowing either disposal or reuse.

These graft polymer coagulants are capable of effectively treating surfactant-laden wastewater without altering either pH or conductivity, and they are capable of functioning in an environment of relatively high TDS. Commercial benefits include the pre-treatment of wastewater to allow for effective disposal within permit guidelines, or if being sent to a publicly owned treatment worksite, the ability to utilize the treated wastewater for further polishing with filtration for reuse. Prior attempts using commercially available coagulants such as condensation amine polymers, polyDADMAC, and tannin-based coagulants, have shown no success in treating these wastewaters. Filtration without pretreatment results in fouling of the filter media.

The following examples are illustrative and should not be construed to limit the invention.

EXAMPLES

Example 1

Polymer Preparation (Chitosan/METAS)

A 4-necked flask was equipped with a mechanical stirrer, reflux condenser, thermometer socket and nitrogen inlet. 250.00 g of deionized water was charged to the reactor flask. The flask was stirred at 300-350 rpm and a nitrogen blanket was applied. The reaction mass was heated to 25-30° C. 21 g of Chitosan was added to the flask. The flask was heated to 72-75° C. 12 g of glacial acetic acid was added to the Chitosan. The mixture was stirred for 60 minutes and then cooled to 35-40° C. 50 g of 2-Methacryloyloxyethyltrimethylammonium methyl sulfate (METAS) solution was added to the flask and nitrogen sparged for 20 minutes. The flask was heated to 73-75° C. and a sodium metabisulfite solution (2.05 g in 8.72 g of water) and t-butyl hydroperoxide (t-BHP) (2.68 g in 8.32 g of water) were charged to the flask solution simultaneously over a period of 1 hour via syringe pump. The temperature was maintained at 73-75° C. and held at that temperature for 1 hour. The mixture was cooled to room temperature. The resulting polymer yielded a homogeneous viscous light-yellowish solution of poly(METAS)-Chitosan having 12% wt. solids.

The viscosity of the resulting polymer was measured using a standard Brookfield viscometer, DVII, Spindle 61 at 25° C. and 30 rpm. The resulting polymer had a viscosity of 700 cps. The presence of an ester group in infrared spectroscopy after purification confirms the grafting process and an NMR confirms the polymer structure.

Example 2

Chitosan based polymeric chloride free coagulant polymer was made in a one pot preparation process. Chitosan and (2-(Methacryloyloxy)ethyl)trimethyl ammonium methyl sulfate solution were grafted via polymerization using t-butylhydroperoxide and sodium metasulfite as initiator and reductant respectively. The resulting polymer yielded a homogenous viscous light yellowish solution of poly(METAS)—chitosan, a chloride free coagulant composition. The product contains 9%-10% solids with a Brookfield viscosity of 150-900 cps and a pH of 4-6.

Example 3

Laundry Water Testing

Laundry water containing tap water (≈6 liters), commercially available detergent (10 ml) and soils (≈4 g) from a soil ballast containing several consumer type soils were used as the test wastewater. The main ingredients of this laundry wastewater were as follows:

Detergent: alcoholethoxy sulfate, linear alkyl benzene sulfonate, alcohol ethoxylate, citric acid Soil Ballast: 20% protein (from egg white powder), 15% starch (corn starch), 15% kaoline, and 15% salt The test water temperature was about 72° F., and the pH of the test wastewater remained around 8 both before and after the polymer treatments were added. The wastewater samples were added to jars and equipped with paddle stirrers. The C/MAOA Quat treatment polymer of Example 2 was added to the jars in various dosages. Comparative tests using commercially available wastewater coagulants were also conducted with the wastewater. After treatment addition, the samples were stirred at a speed of 100 rpm for two minutes and at a speed of 35 rpm for 10 minutes. The speed was then reduced to 0 rpm and samples were taken from the bottom of the jars after 30 minutes. Turbidity of the tested samples were measured using a turbidity meter.

Results

The C/MAO Quat polymer treatment clarified the wastewater from a baseline of 178 ntu at 0 ppm C/MAOA to 19 ntu at 4,000 ppm C/MAOA. A settlable floc was generated at this ppm addition level. This occurred with no appreciable change in pH ($\approx$7-8) or conductivity ($\approx$900 $\mu$S) at 4,000 ppm. A commercially available tannin based copolymer treatment formed a floc at 400 ppm (not at 300, 500, 600, etc.) but did not appreciably clarify. A commercially available poly DADMAC treatment did not floc at any concentration from 10-6000 ppm.

While this invention has been described with respect to particular embodiments thereof, numerous other forms and modifications of this invention will become apparent to those skilled in the art. The appended claims and this invention generally should be construed to cover such other forms and modifications of the present invention.

What is claimed is:

1. A method of reducing the COD of an aqueous medium containing a COD level of >200 ppm based upon 1 million parts of said aqueous medium, said method comprising adding to said aqueous medium an effective amount of coagulant chitosan/(meth)acrylyloxy alkyl quaternary ammonium salt graft polymer (C/MAOA Quat), said aqueous medium having an anionic surfactant level of greater than 50 ppm therein and said aqueous medium comprising a wastewater selected from the group consisting of laundry, dishwashing, textile manufacturing, metal cleaning, and degreasing wastewaters, said C/MAOA Quat being chloride free and having a viscosity of from about 100 cps to about 3,000 cps.

2. A method as recited in claim 1 wherein said C/MAOA Quat is added to said wastewater in an amount of about 4-10,000 ppm, and said C/MAOA Quat is poly-METAS-Chitosan polymer having repeating units of:

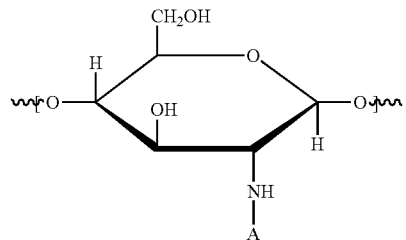

wherein A has the formula of:

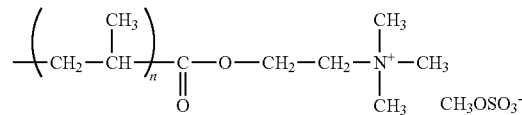

and wherein n is an integer from 50 to 5000.

3. A method as recited in claim 2 wherein said C/MAOA Quat is added to said wastewater in an amount of about 40-4,000 ppm.

4. A method as recited in claim 2 wherein said wastewater is wastewater from a dishwashing process.

5. A method as recited in claim 2 wherein said wastewater is wastewater from a laundry.

* * * * *